(12) United States Patent
Takishita

(10) Patent No.: US 7,107,307 B1
(45) Date of Patent: Sep. 12, 2006

(54) METHOD OF INDICATING USER STATUS IN GROUPWARE AND APPARATUS FOR USE IN THE SAME

(75) Inventor: Nobuaki Takishita, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 09/675,883

(22) Filed: Sep. 29, 2000

(30) Foreign Application Priority Data

Sep. 30, 1999 (JP) .................................. 11-277817

(51) Int. Cl.
   *G06F 15/16* (2006.01)
(52) U.S. Cl. ..................... 709/203; 709/217; 345/501
(58) Field of Classification Search ................ 709/204, 709/201, 217, 227, 203, 215, 229, 225; 345/501
   See application file for complete search history.

(56) References Cited

U.S. PATENT DOCUMENTS

| | | | |
|---|---|---|---|
| 4,974,173 A * | 11/1990 | Stefik et al. ................. 715/751 |
| 5,504,889 A * | 4/1996 | Burgess ....................... 707/100 |
| 5,511,187 A * | 4/1996 | Cragun ............................ 707/8 |
| 5,590,178 A * | 12/1996 | Murakami et al. ........ 379/93.18 |
| 5,842,195 A * | 11/1998 | Peters et al. .................... 707/1 |
| 5,862,325 A * | 1/1999 | Reed et al. .................. 709/201 |
| 5,877,766 A * | 3/1999 | Bates et al. ................. 345/854 |
| 6,057,835 A * | 5/2000 | Sato et al. ................... 345/759 |
| 6,072,490 A * | 6/2000 | Bates et al. ................. 345/821 |
| 6,230,185 B1 * | 5/2001 | Salas et al. ................. 709/205 |
| 6,490,583 B1 * | 12/2002 | Tada et al. ...................... 707/9 |

\* cited by examiner

*Primary Examiner*—Saleh Najjar
*Assistant Examiner*—Benjamin R Bruckart
(74) *Attorney, Agent, or Firm*—Rafael Perez-Pineiro; Anne Vachon Dougherty

(57) ABSTRACT

Disclosed is a method of indicating a user status in groupware for recognizing the user status in the groupware. The method comprises the steps of (a) displaying a status row bar in a view window of each user; and (b) indicating the status whether or not each user has read each document by the displayed status row bar. To carry out the method, an apparatus comprises a network; a server connected to the network and including a status database for storing the status of each user to each document; a manager operation section connected to the network and including a manager screen and a manager input device; and a user operation section connected to the network and including at least one user screen and at least one user input device.

14 Claims, 10 Drawing Sheets

| | A-USER | B-USER | C-USER | D-USER |
|---|---|---|---|---|
| DOCUMENT 1 | FINALLY CHANGED | READ | READ | NOT READ |
| DOCUMENT 2 | NOT READ | FINALLY CHANGED | NOT READ | NOT READ |
| DOCUMENT 3 | READ | FINALLY CHANGED | READ | NOT READ |
| DOCUMENT 4 | READ | FINALLY CHANGED | NOT READ | NOT READ |
| DOCUMENT 5 | NOT READ | FINALLY CHANGED | READ | NOT READ |

C-USER CHANGES DOCUMENT 3

| | | | | |
|---|---|---|---|---|
| DOCUMENT 3 | NOT READ | NOT READ | FINALLY CHANGED | NOT READ |

A-USER READS DOCUMENT 3

| | | | | |
|---|---|---|---|---|
| DOCUMENT 3 | READ | NOT READ | FINALLY CHANGED | NOT READ |

|  | A-USER | B-USER | C-USER | D-USER |
|---|---|---|---|---|
| DOCUMENT 1-1 | FINALLY CHANGED | READ | READ | NOT READ |
| DOCUMENT 1-2 | NOT READ | FINALLY CHANGED | NOT READ | NOT READ |
| DOCUMENT GROUP 1 (DOCUMENTS 1-1 AND 1-2) | NOT READ (SOME DOCUMENTS NOT READ) | READ (ALL READ) | NOT READ (SOME DOCUMENTS NOT READ) | NOT READ (SOME DOCUMENTS NOT READ) |
| DOCUMENT 2 | READ | FINALLY CHANGED | READ | NOT READ |
| DOCUMENT 3 | READ | FINALLY CHANGED | READ | NOT READ |

|  | A-USER | B-USER | C-USER | D-USER |
|---|---|---|---|---|
| DOCUMENT 1 | FINALLY CHANGED | READ | READ | NOT READ |
| DOCUMENT 2 | NOT READ | FINALLY CHANGED | NOT READ | NOT READ |
| DOCUMENT 3 | READ | FINALLY CHANGED | READ | NOT READ |
| DOCUMENT 4 | READ | FINALLY CHANGED | NOT READ | NOT READ |
| DOCUMENT 5 | NOT READ | FINALLY CHANGED | READ | NOT READ |

C-USER CHANGES DOCUMENT 3

| DOCUMENT 3 | NOT READ | NOT READ | FINALLY CHANGED | NOT READ |
|---|---|---|---|---|

A-USER READS DOCUMENT 3

| DOCUMENT 3 | READ | NOT READ | FINALLY CHANGED | NOT READ |
|---|---|---|---|---|

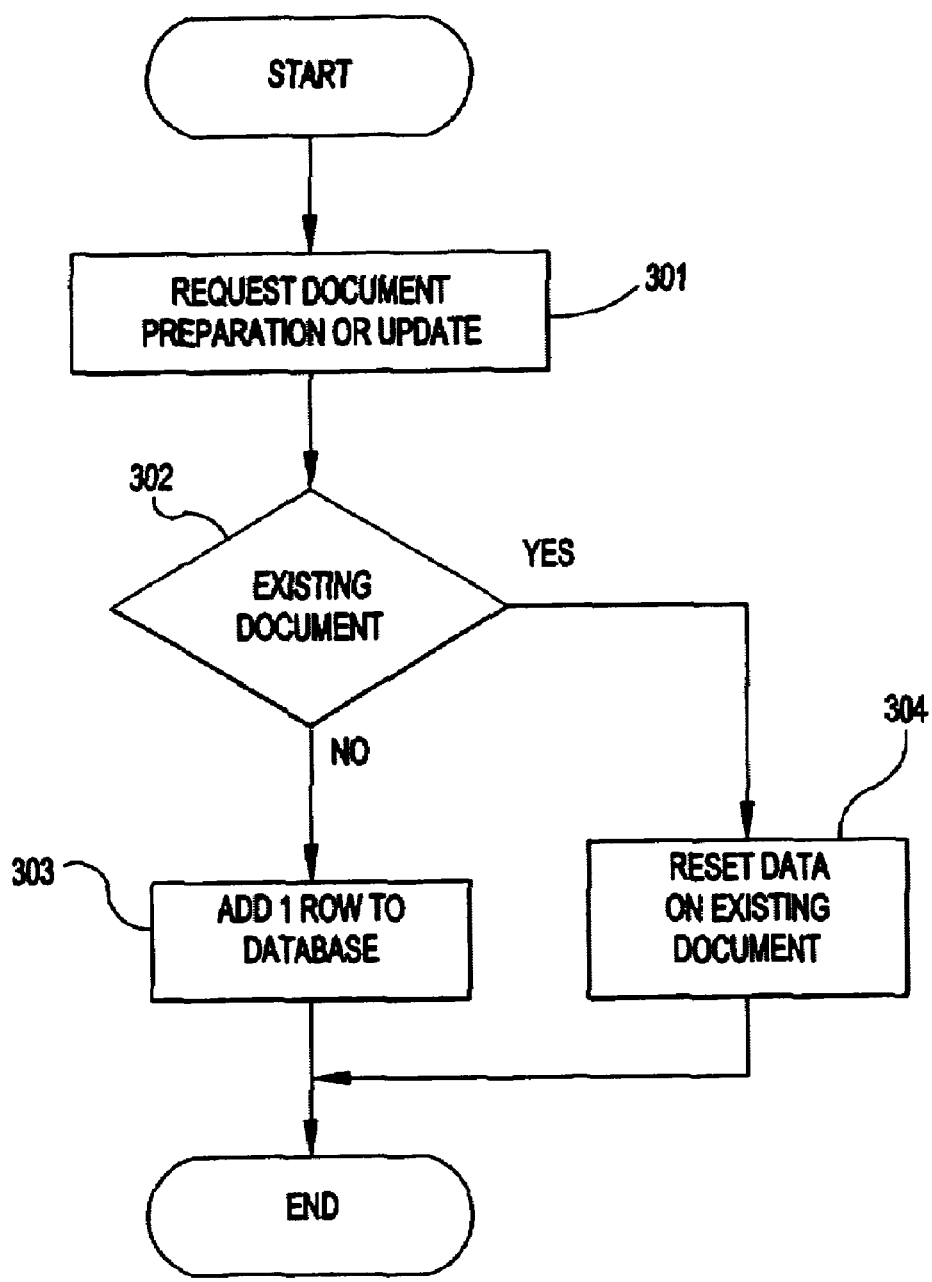

|  | A-GROUP | B-GROUP | C-GROUP |
|---|---|---|---|
| DOCUMENT 1 | 30% | 50% | 60% |
| DOCUMENT 2 | 10% | 30% | 50% |
| DOCUMENT 3 | 40% | 60% | 80% |

FIG.10

| USER NAME | ENTRY USER | DEFAULT USER |
|---|---|---|
| A-USER | YES | 1 |
| B-USER | YES | 2 |
| C-USER | YES | 3 |
| D-USER | YES | 4 |
| ... | ... | |
| ... | ... | |
| ... | ... | |
| Z-USER | NO | |

FIG.11

| CLIENT SCREEN USER NAME | ORDER OF INDICATION 1 | ORDER OF INDICATION 2 | ORDER OF INDICATION 3 | .... |
|---|---|---|---|---|
| C-USER | A-USER | B-USER | | |
| D-USER | A-USER | B-USER | E-USER | |
| | | | | |

FIG.12

| USER NAME | GROUP NAME |
|---|---|
| A-USER | A-GROUP |
| B-USER | A-GROUP |
| C-USER | A-GROUP |
| D-USER | B-GROUP |
| ... | ... |
| ... | ... |
| ... | ... |
| Z-USER | J-GROUP |

FIG.13

| GROUP NAME | ORDER OF INDICATION |
|---|---|
| A-GROUP | 1 |
| B-GROUP | 2 |
| C-GROUP | 3 |
| D-GROUP | 4 |

METHOD OF INDICATING USER STATUS IN GROUPWARE AND APPARATUS FOR USE IN THE SAME

FIELD OF THE INVENTION

The present invention relates to a method of indicating a user status in groupware for exchanging information between groups by using a network, for the purpose of recognizing each status of users composing each group, and an apparatus for use in the same. More particularly, the invention relates to a method of indicating a user status in groupware, which enables each user to recognize the status whether or not each user has read each document, and an apparatus for use in the same.

BACKGROUND OF THE INVENTION

Heretofore, various types of groupware have been known as software for exchanging information between groups by using a network. Such groupware are configured so as to assist the following application. Each document or each document group consisting of a plurality of documents, which users themselves or other users have entered or changed, is listed in a view window of each user so that all the users can read each document or each document group. Then, all the users composing the group read each document or each document group issued by other users and give opinions on each document or each document group so that all the users can have an exchange of opinions or a discussion.

FIG. 14 is an illustration of one example of the view window of the user in the conventional groupware. In the example shown in FIG. 14, a document list is typically displayed in a view pane on the right side. An asterisk is displayed on the left end of each document or each document group in the view pane or a title or the like of the document is displayed in red, whereby the user can determine whether or not he/she has already read the document.

However, in the conventional groupware, the user can recognize only whether or not he/she has already read the displayed document or document group, and the user cannot recognize whether or not other users have read the document or the document group. For example, when project members use a discussion database, the members cannot recognize whether or not specific members have read the document entered or changed by the members themselves or other members.

That is, when the database using such groupware is used, work always progresses on the assumption that others have read each document. A meeting can show who are present at the meeting. However, when such a database is used like an actual meeting, it, in fact, often happens that some members have not read the document because they are busy or because they take a day off or a holiday or they are on a business trip. This may hinder or delay the progress of the work. There is no problem in a system enabling each member to recognize to whom the document has been passed among regular members, such as a circular document. However, the discussion database, in which the contents of the document being used are being rapidly changed one after another, as in the case of the meeting, does not have means for recognizing whether or not other members have read each document, as described above.

Moreover, due to the above problem, a person who manages the project cannot ascertain whether or not all the project members take part in the discussion. Furthermore, the members can recognize who has prepared or edited each document by checking properties of each document, but there is no means for checking whether or not the members composing the group have read the changed document after the document has been finally changed.

The following technique is disclosed as a method of managing a folder for making it easy to use groupware in Unexamined Japanese Patent Application Publication No. 7-84748. This technique is that it is made possible to define the folder having new attribute information or to edit the attribute information, whereby the shape or color of the folder is changed and displayed in accordance with the folder attribute information and the change of the attribute information. However, although this technique can manage the whole folder, this technique cannot achieve an object of the invention, i.e., this technique does not allow each user to recognize whether or not each user has read each document or each document group.

It is an object of the present invention to solve the above problem and to provide a method of indicating a user status in groupware, which enables each user to recognize the status whether or not each of users composing the group has read each document or each document group displayed in the view window, and an apparatus for use in the same.

SUMMARY OF THE INVENTION

A method of indicating a user status in groupware of the present invention relates to a method of indicating a user status for recognizing the user status in groupware. The method comprises the steps of (a) displaying a status row bar in a view window of each user; and (b) indicating the status whether or not each user has read each document by the displayed status row bar. Thus, by viewing the status row bar, the user can recognize the status whether or not each of the users composing a group has read each document or each document group displayed in the view window.

Preferred examples of the method of indicating a user status in groupware of the present invention are as follows. When the users are divided into groups, the status indication shows what percentage of the users of each group have read each document for each group. Moreover, when the documents are divided into document groups, each of which consists of a plurality of documents, the status indication shows whether at least one of the documents in each document group has not been read for each document group. Whether or not each user has read each document is indicated by colors or patterns. In any case, the method of indicating a user status in groupware of the present invention can be preferably implemented.

An apparatus for carrying out a method of indicating a user status in groupware of the present invention comprises a network; a server connected to the network and including a status database for storing the status whether or not each user has read or changed each document; a manager operation section connected to the network and including a manager screen and a manager input device; and a user operation section connected to the network and including at least one user screen and at least one user input device. A manager (in fact, a program running on a CPU) determines the status whether or not each user has read each document through the network. Thus, the program updates the status database. Thus, the program executes status displaying indicating the status whether or not each user has read each document in the status row bar in the view window on each of the user screens of the users. Preferred examples of the apparatus are as follows. When the user finally changes a certain document, the statuses of the other users are set to "not read" in the status database. Moreover, a mail is sent to members of a specific group who have not read the document so as to urge these members to read the document. Thus, the method of indicating a user status in groupware of the present invention can be preferably carried out.

BRIEF DESCRIPTION OF THE DRAWINGS

For a more complete understanding of the present invention and the advantages thereof, reference is now made to the following description taken in conjunction with the accompanying drawings, in which;

FIG. 1 shows a structure of one example of a status database for use in the present invention;

FIG. 4 shows one example of change of data in the status database of the present invention;

FIG. 5 is a flowchart for describing one example of processing for preparing or updating a document in a server;

FIG. 10 shows one example of the structure of a user management table;

FIG. 11 shows one example of the structure of each-user indication specification table;

FIG. 12 shows one example of the structure of a user-group association table;

FIG. 13 shows one example of the structure of a group indication table; and

DETAILED DESCRIPTION OF THE PREFERRED EMBODIMENTS

Of a method of indicating a user status in groupware and an apparatus for use in the same of the present invention, the method of indicating a user status in groupware will be first described. The important point in the indication of the user status of the present invention is that the method includes displaying a status row bar in a view window of each user and indicating in the displayed status bar the status whether or not each user has read each document.

Figure 2:
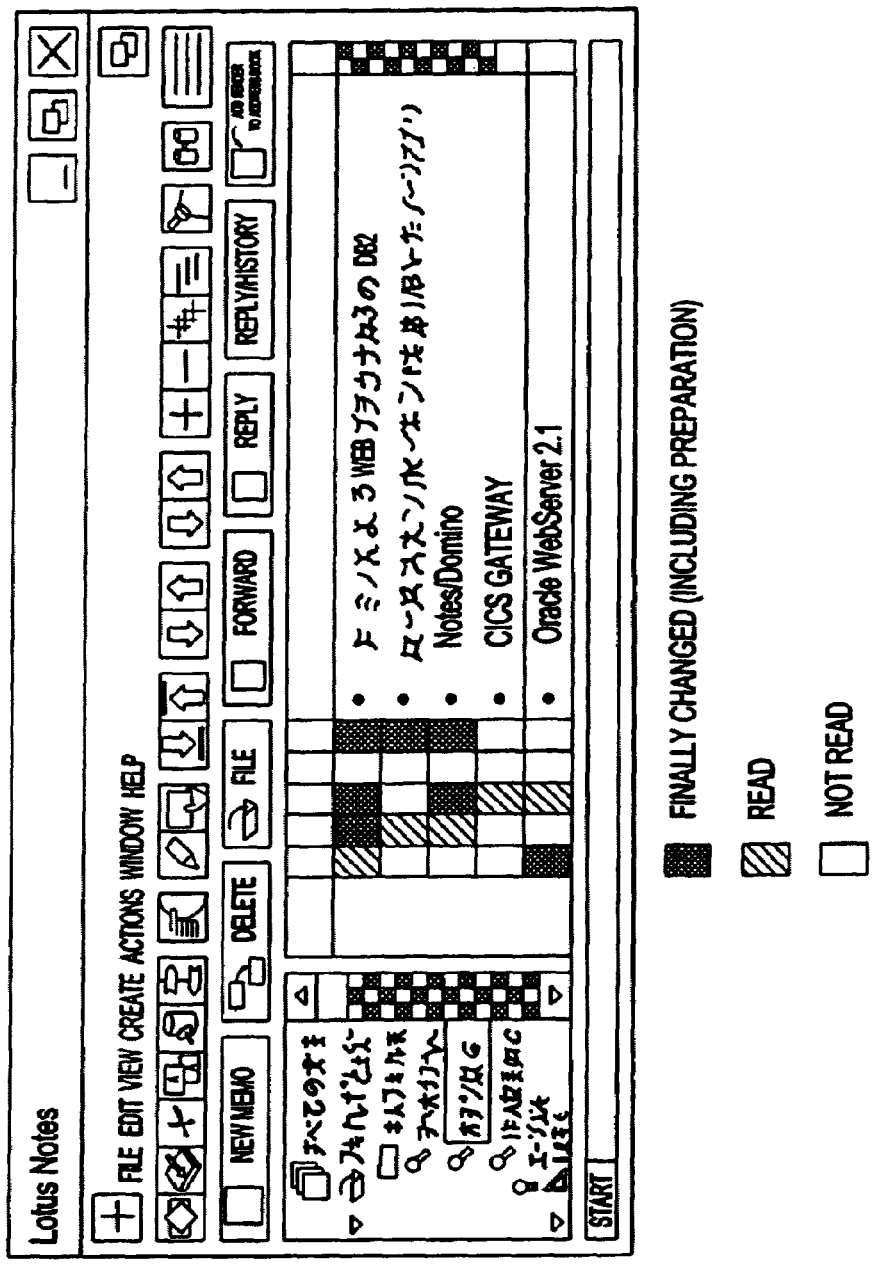
FIG. 2 shows one example of a view window of each user of the present invention.

In indicating the user status, a group manager specifies, for example, a user group A which can be displayed in the status row bar. The manager specifies the user group A in order to reduce a load on a server and a network, because the specification of all the users increases the load on the server and the network. Next, the server includes and uses a status database having a structure shown as one example in FIG. 1. In the example shown in FIG. 1, the users composing the user group A are users A to D, and the documents are separate documents, i.e., a document 1-1, a document 1-2, a document 2 and a document 3, and a document group 1 consisting of the document 1-1 and the document 1-2. The status database has the data on whether or not each user has read each document or each document group and who has finally changed each document or has prepared a new document. Next, FIG. 2 shows one example of the view window of each user. In the example shown in FIG. 2, by using the status database having the structure shown as one example in FIG. 1, whether or not each user, i.e., each of the users A to D composing the user group A has read each document listed in a topic column is indicated in the form of "read" or "not read" in a new status row bar, and who has finally changed each document or has prepared the new document is indicated in the form of "finally changed (including prepared)" in this new status row bar.

In the above-mentioned example, the specification of the user group depends on manager setting at first. However, this specification may be changed in accordance with the setting of the view window of each user. Moreover, in the above-described example, each row of the status row bar is displayed for each user. However, each row may be displayed for each user group, and what proportion of the users of the user group have read the document may be indicated by a shade of color. For example, a dark color may indicate that a high proportion of the users have read the document, and that a light color may indicate that few users have read the document. Furthermore, when the user does not want to indicate the status whether or not he/she has read a certain document and so on, the user specifies document properties of this document, whereby the user can specify this document so as not to recognize the contents of information in the status row bar. In this case, the row of this document is displayed in black, for example.

Figure 3:
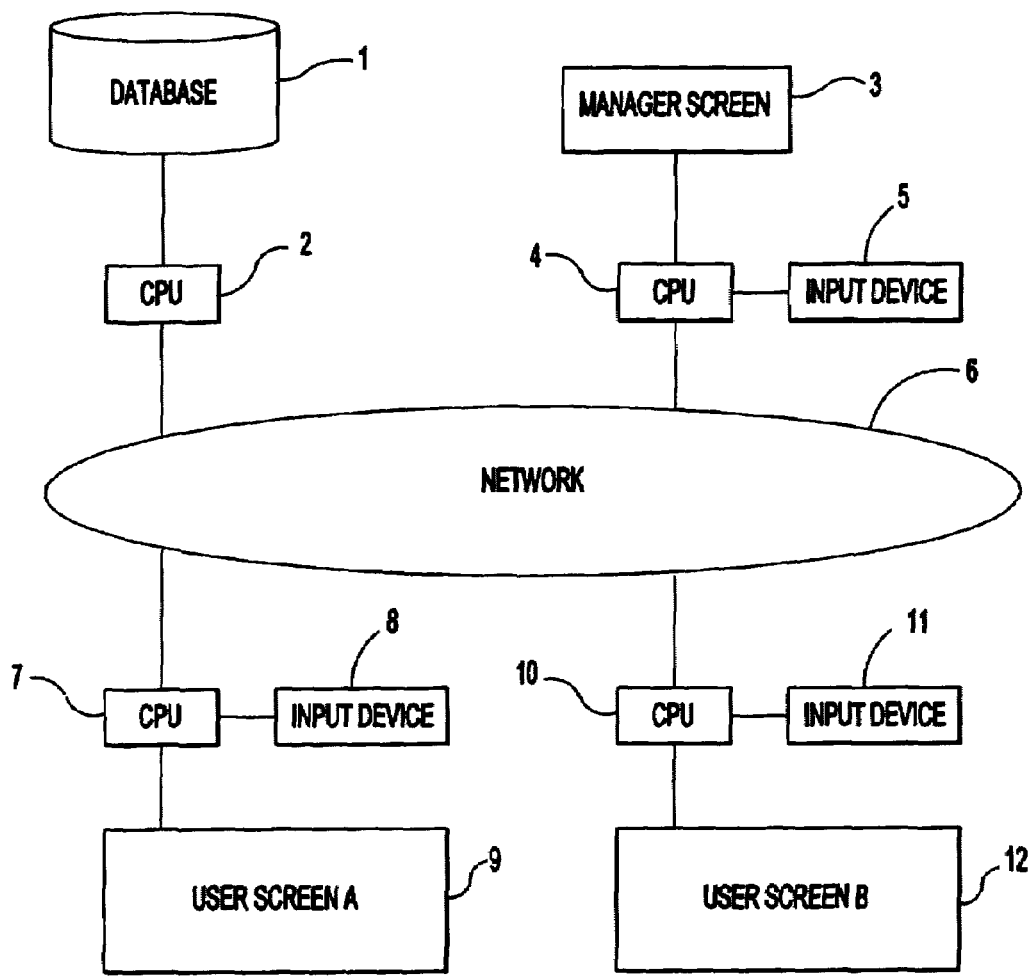
FIG. 3 is a block diagram of a constitution of one example of an apparatus for carrying out a method of indicating a user status in groupware of the present invention.

Next, the apparatus for carrying out the method of indicating the user status in groupware of the present invention will be described. FIG. 3 is a block diagram of a constitution of one example of the apparatus for carrying out the method of indicating the user status in groupware of the present invention. In the example shown in FIG. 3, the apparatus of the invention comprises a network 6; a server connected to the network 6 and including a status database 1 for storing the status of each user to each document and a CPU 2; a manager operation section connected to the network 6 and including a manager screen 3, a CPU 4 and an input device 5; a user-A operation section connected to the network 6 and including a user screen A 9, a CPU 7 and an input device 8; and a user-B operation section connected to the network 6 and including a user screen B 12, a CPU 10 and an input device 11. It is needless to say that the number of users is not limited to two, i.e., the users A and B. One example of the operation of the above-mentioned apparatus is as follows. A program running on the CPU 2 determines the status whether or not each user has read each document through the network 6. And, the program updates the status database 1. Thus, the program executes status displaying indicating the status as to whether or not each user has read each document in the status row bar in the view window on each of the user screens (9 and 12) of the users.

The contents of the status database 1 and the operation of the above-mentioned apparatus will be described below in detail. FIG. 4 shows one example of the change of data in the status database of the present invention. In the example shown in FIG. 4, a status database 201 has the data on the status of each of documents 1 to 5 to each of users A to D. In the status database 201, when the user C changes the document 3, the row of the document 3 is changed as shown in a row 202. That is, a cell of the user C is changed into "finally changed" in the row 202. At the time of this final change, the other users do not read the contents of the document 3 changed by the user C, and thus each of the cells of the users A, B and D is changed into "not read". Furthermore, when the user A reads the document 3, the row of the document 3 is changed as shown in a row 203. That is, the cell of the user A is changed into "read" in the row 203, and the status in the row 202 is kept as it is in each of the cells of the users B, C and D.

FIG. 5 is a flowchart for describing one example of processing for preparing or updating the document in the server. The processing for preparing or updating the document in the server will be described with reference to FIG. 5. First, in step 301, the user prepares a new document or updates the document, and the user registers the document in the server. Then, in step 302, whether or not the registered document is an existing document is checked. When the result of the check shows that the registered document is the new document, the processing goes to step 303. In step 303, row data, which indicates that only the user who has prepared the document is in the "finally changed" status and the other users are in the "not read" status, is added to the status database. When the result of the check shows that the registered document is the existing document, the processing goes to step 304. In step 304, the existing row data is reset so that the status of the user who has changed the document may be indicated by "finally changed" and the statuses of the other users may be indicated by "not read". The processing for preparing or updating the document in the server ends after the above procedure.

Figure 6:
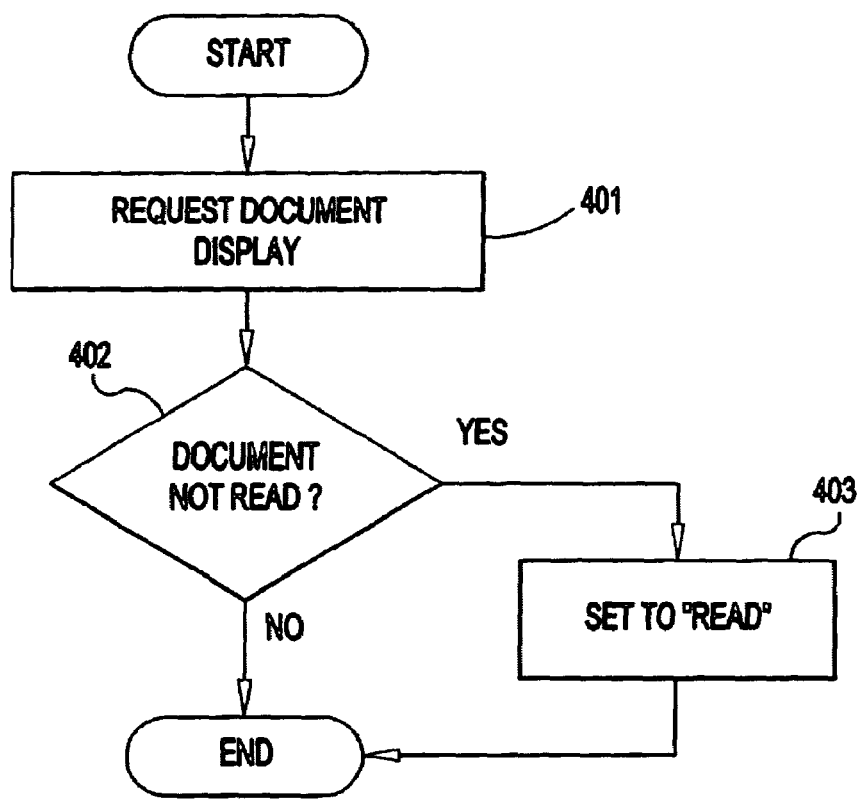
FIG. 6 is a flowchart for describing one example of the processing for displaying the document in the server.

FIG. 6 is a flowchart for describing one example of the processing for displaying the document in the server. The processing for displaying the document in the server will be described with reference to FIG. 6. First, in step 401, the user requests the server to display the document. Then, in step 402, whether or not the requesting user has read the requested document is checked. When the result of the check shows that the user has not read the document, the processing goes to step 403. In step 403, the cell of the requested document by the requesting user in the status database is set to "read", and the document is displayed to the user. When the result of the check shows that the user has read the document, the document is displayed for the user without any processing.

Figure 7:
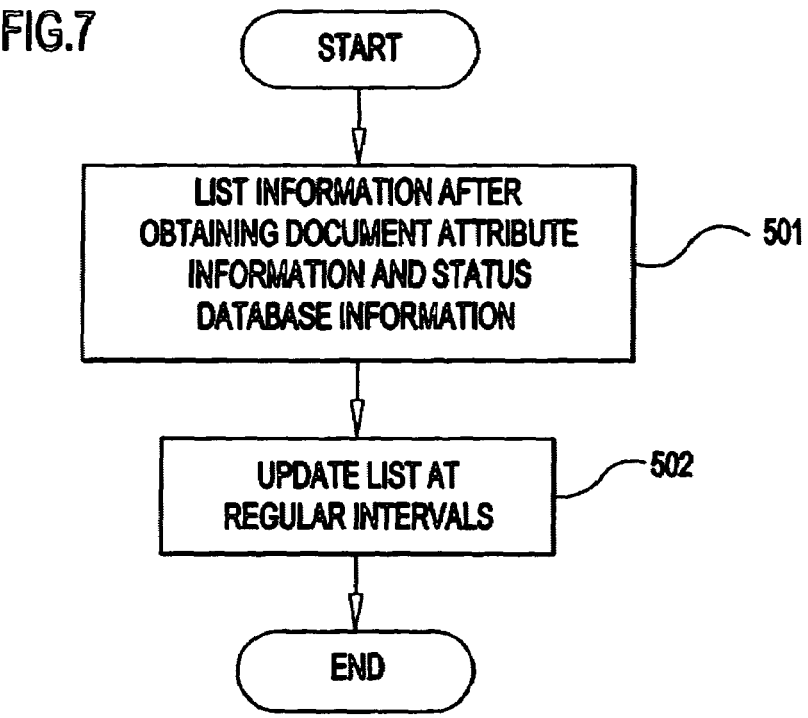
FIG. 7 is a flowchart for describing one example of the processing of a user screen.

FIG. 7 is a flowchart for describing one example of the processing of the user screen. The processing of the user screen will be described with reference to FIG. 7. First, in step 501, attribute information such as a document title and status database information are obtained from the server, and the information are displayed in the view window displayed on the user screen by using the status row bar. One example of the display is as shown in FIG. 2 discussed above. Then, in step 502, the status database information is obtained from the server at regular intervals, and the display is updated. Thus, the processing of the user screen ends.

Figures 8, 9:
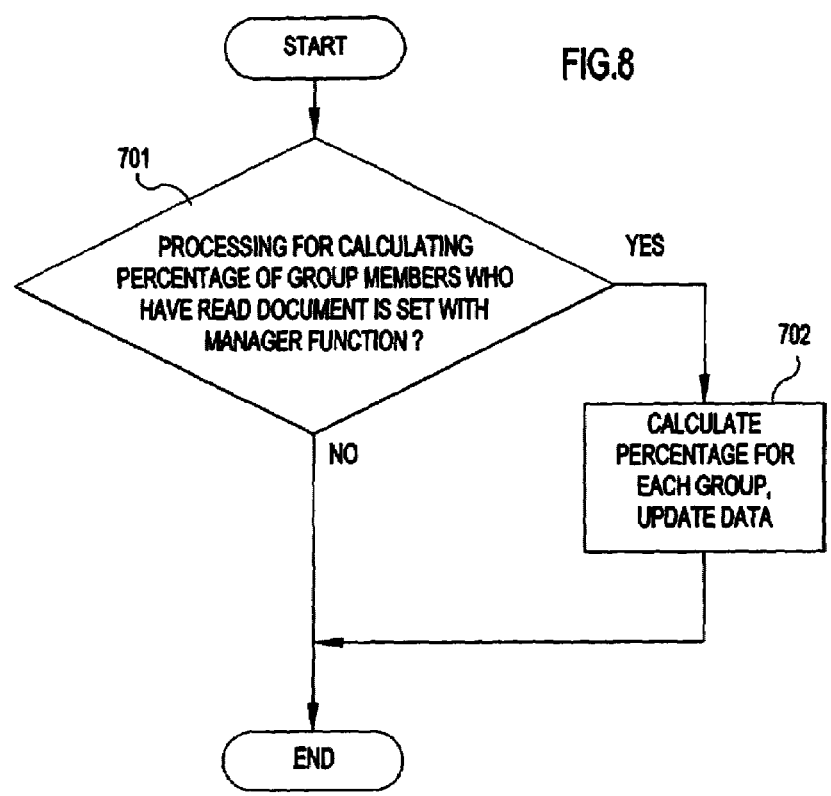
FIG. 8 is a flowchart for describing one example of the processing for calculating a percentage of group members who have read the document in the server.
FIG. 9 shows one example of the structure of the database on the percentage of the group members who have read the document.
Figure 14:
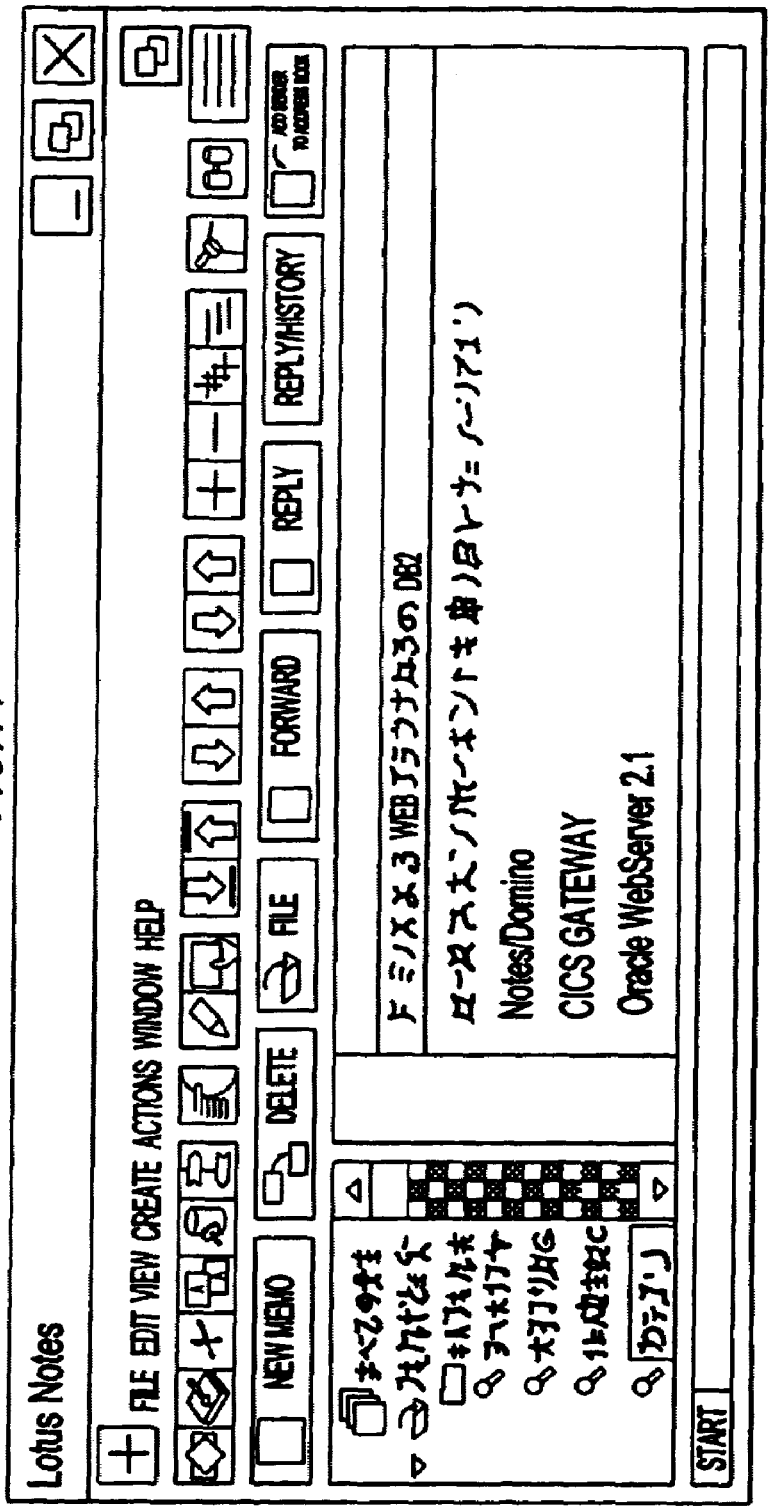
FIG. 14 shows one example of the view window of each user of the prior art.

Next, the processing for calculating a percentage of group members who have read the document will be described as a modification of the present invention described above. The processing for calculating the percentage of the group members who have read the document is performed as a function of the manager, when the user wants to set the status row bar for indicating what proportion of the group members have read the document by a shade of color, a difference in pattern or the like. FIG. 8 is a flowchart for describing one example of the processing for calculating the percentage of the group members who have read the document in the server. The processing for calculating the percentage of the group members who have read the document in the server will be described with reference to FIG. 8. First, in step 701, whether or not the processing for calculating the percentage of the group members who have read the document is set with the manager function is checked. When the result of the check shows that this processing is set, what percentage of the members of the group specified for each document are in the "read" status is calculated for each group, and then the data on the percentage of the group members who have read the document is set. When the result of the check shows that this processing is not set, the processing for calculating the percentage of the group members who have read the document cannot be performed, and thus the processing ends without any processing. FIG. 9 shows one example of the structure of the database on the percentage of the group members who have read the document. In the example shown in FIG. 9, this database has the data on what percentage of the users composing each of groups A to C have read each of the documents 1 to 3.

The following examples are considered as an application of the above-described processing for calculating the percentage of the group members who have read the document. First, for example, when the document that is important but has been little read is on an intra-company bulletin board, the user can send the members of a specific group who have not read the document a mail urging these members to read the document, with a right-click on the status row of the document or otherwise. Alternatively, the user can send the urging mail to all of the members who have not read the document with the right-click on the document title or otherwise. Secondly, "to", "cc (carbon copy)" and "bcc (blind carbon copy)" for the mail may be set in each row of the status row bar. Thus, although the user has had to heretofore memorize ACK (acknowledge) to see whether or not the mail has been read by all of the members to whom the mail is addressed, the user can confirm whether or not all the members have read the mail or what proportion of the members have read the mail. Moreover, the user right-clicks on the status row, whereby a list of the members who have read the document and a list of the members who have not read the document are displayed and the urging mail can be sent to the members who have not read the document.

As described above in detail, in the present invention, the status row bar is displayed in the view window of each user by using the status database, and the status whether or not each user or each user group has read each document is indicated. In fact, this status indication is given by using various databases besides the status database. One example of the display of the status row bar using the status database will be more specifically described below. That is, in FIG. 3 showing the constitution of the apparatus, the section shown as the status database 1 is, in fact, a collection of databases. Each database comprises the database for performing the function of setting a discussion database status row bar for use in the display for each user, and the database for performing the function of setting the status row bar indicating the percentage of the group members who have read the document, for use in the display for each group. The above two setting functions will be described below in conjunction with each database.

Description of the Function of Setting the Discussion Database Status Row Bar

The database for performing this function comprises:

a discussion database for allowing each user to add or change each document;

a user management table (FIG. 10) that is a table of each user who can access the discussion database;

a status database (FIG. 1) having the row data on the contents of the users who are indicated by YES in an entry user item in the user management table; and an each-user indication specification table (FIG. 11) for customizing the status row bar in which each user is indicated by default.

The function of setting the discussion database status row bar using the above-mentioned databases and tables is executed by the following functions.

A Function of Setting an Entry User

It is expected that many users can access the discussion database in some cases. The users to be indicated in the status row bar do not have to be all of the users who can access the discussion database. The users who require recording whether or not they have read each document are set by the manager screen so as not to degrade performance of the server. These users who should be set are specified by indicating YES in the entry user item in the user management table shown in FIG. 10.

A Function of Setting a Default Screen

When the user screen is displayed, the users to be indicated in the status row bar are set by the default. This function is also set by the manager screen. These users are set by specifying an order in which these users are indicated in a default user item in the user management table shown in FIG. 10.

A User Customize Function

The status row bar of each of the users specified by the function of setting the default screen is displayed on the user screen, but the users to be indicated in the status row bar may differ according to users. By the user customize function, the status row bar inherent to each user is set by the user screen, and the status row bar is added to or corrected in the each-user indication specification table shown in FIG. 11. At the time of the setting, the list of the entry users is obtained from the user management table shown in FIG. 10, and the users to be indicated are selected from the list. To specify users other than the entry users, user names are obtained from the user management table shown in FIG. 10, and the entry user items of the users to be specified are corrected to YES. Moreover, even when the users to be indicated are not included in the user management table shown in FIG. 10, the user having access to the discussion database adds the row of the user to be indicated to the user management table and sets the entry user item to YES.

Description of the Function of Setting the Status Row Bar Indicating the Percentage of the Group Members who have Read the Document The database for performing this function comprises:

a database comprising the document group such as a WEB homepage or each document;

a user-group association table (FIG. 12) that is a table of the users who can access the database and the group of these users;

a group indication table (FIG. 13) for specifying the group to be indicated in the status row bar on the user screen;

a status database (FIG. 1) having the row data on the contents of the users belonging to the group specified by the group indication table; and a database on the percentage of the group members who have read the document (FIG. 9), for recording what proportion of the group members have read each document.

The function of setting the status row bar indicating the percentage of the group members who have read the document, using the above-described databases and tables is executed by the following functions.

A Group Setting Function

The group which each user belongs to is specified, and the user-group association table shown in FIG. 12 is set by the manager screen.

A Function of Setting the User Screen Indicating the Percentage of the Group Members Who Have Read the Document The percentage of the group members who have read the document to be indicated in the status row bar is set. This function is also set by the manager screen. The order of indication is specified by setting the order of indication in the group indication table shown in FIG. 13.

Although the preferred embodiments of the present invention have been described in detail, it should be understood that various changes, substitutions can be made therein without departing from spirit and scope of the inventions as defined by the appended claims.

As is apparent from the above description, according to the present invention, the method of the invention includes displaying the status row bar in the view window of each user and indicating the status whether or not each user has read each document by the displayed status row bar. Thus, by viewing the status row bar, the user can recognize the status whether or not each of the users composing the group has read each document or each document group displayed in the view window.

What is claimed is:

1. A method for indicating user access status for each of a plurality of users of collaborative groupware software, said user access status indicating whether each particular user has accessed each document of said groupware, said method comprising the steps of:
   (a) displaying a status row bar in a view window of each user; and
   (b) automatically providing a user access status indication indicating the user access status for every user of each document of said groupware in said displayed status row bar, said user access status indication being viewable by all of said plurality of users of the groupware and indicating one of "read", "not read", and "changed" for each user of each document.

2. The method according to claim 1, wherein when the users are divided into groups, and wherein said user access status indication further shows what percentage of the users of each group have read each document for each group.

3. The method according to claim 1, wherein when the documents are divided into document groups, each of which consists of a plurality of documents, said method further comprising displaying a document group status indication showing whether at least one of the documents in each document group has not been read for each document group.

4. The method according to claim 1, wherein said status indication is provided by colors or patterns.

5. The method according to claim 1, wherein when a user changes a document, the user access status indication for the other of said plurality of users is automatically updated to "not read".

6. An apparatus for carrying out a method of indicating a user access status regarding access to at least one document of collaborative groupware software for each of a plurality of users of groupware, said user access status indicating whether each user has accessed at least one document of said groupware, said apparatus comprising:

a server connected to a network comprising a status determining component for automatically determining and updating user access status for every user of said plurality of users and a status database for storing a plurality of user access status indications; and at least one display device for displaying said user access status indications viewable by all of said plurality of users of groupware and indicating one of "read", "not read", and "changed" for each user of each document.

7. The apparatus according to claim 6, wherein said server further comprises a status update component, wherein when a user changes a document to provide an updated document, the statuses of the other of said plurality of users are automatically set to "not read" in said status database for said document.

8. The apparatus according to claim 7, further comprising a mail generation component from which a mail is sent to members of a specific group who have not read the updated document.

9. The apparatus according to claim 6 wherein when the users are divided into groups, said user access status indication further shows what percentage of the users of each group have read each document for each group.

10. The apparatus of claim 6 wherein when the documents are divided into document groups, each of which consists of a plurality of documents, said method further comprising displaying a document group status indication showing whether at least one of the documents in each document group has not been read for each document group.

11. The apparatus of claim 6 further comprising a manager operation section connected to said network and comprising a manager input device and a manager screen.

12. The apparatus according to claim 6 further comprising a user operation section connected to said network and including at least one user screen and at least one user input device.

13. The apparatus according to claim 6, further comprising a mail generation component from which a mail is sent to members of a specific group who have not read the document.

14. A program storage device readable by machine, tangibly embodying a program of instructions executable by the machine to perform method steps for indicating user access status for each of a plurality of users of collaborative groupware software, said user access status indicating whether each particular user has accessed at least one document of said groupware, said method comprising the steps of:

(a) displaying a status row bar in a view window of each user; and (b) automatically providing a user access status indication indicating the user access status for every user of each document of said groupware in said displayed status row bar, said user access status indication being viewable by all of said plurality of users of the groupware and indicating one of "read", "not read", and "changed" for each user of each document.

* * * * *